United States Patent Office 2,890,506
Patented June 16, 1959

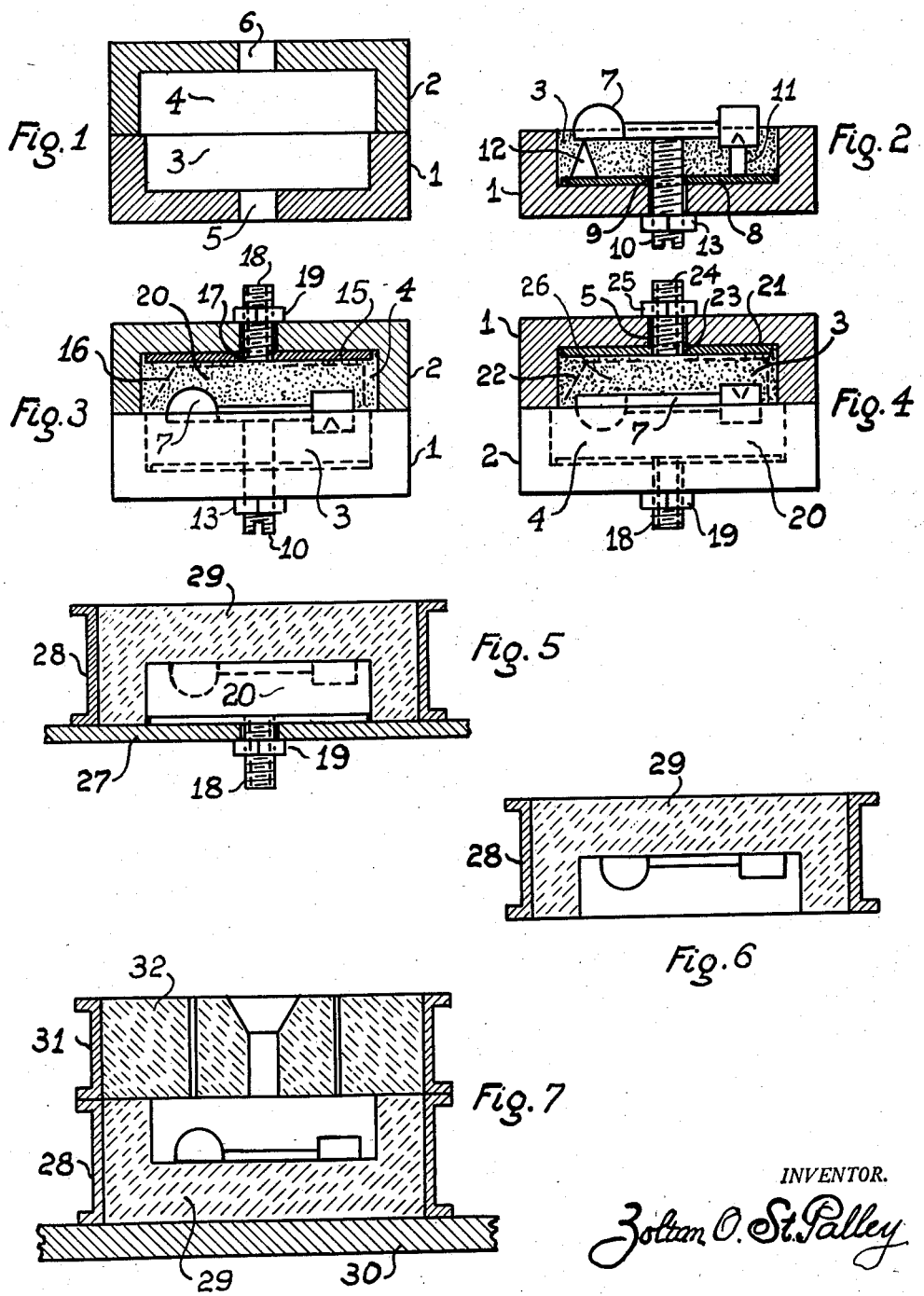

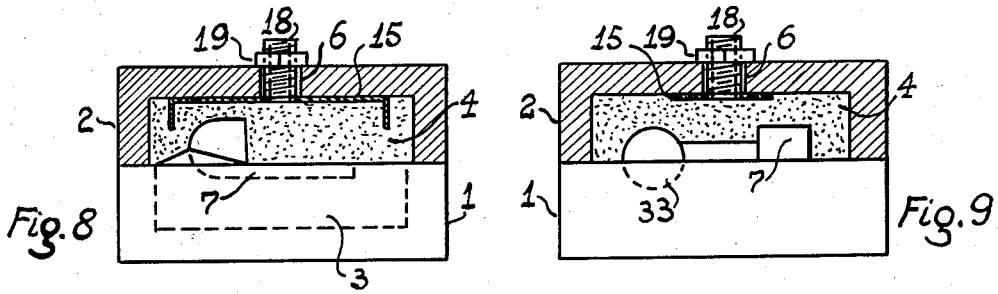
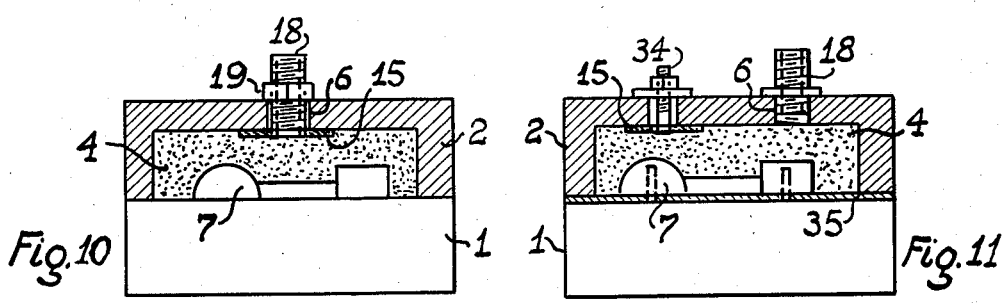
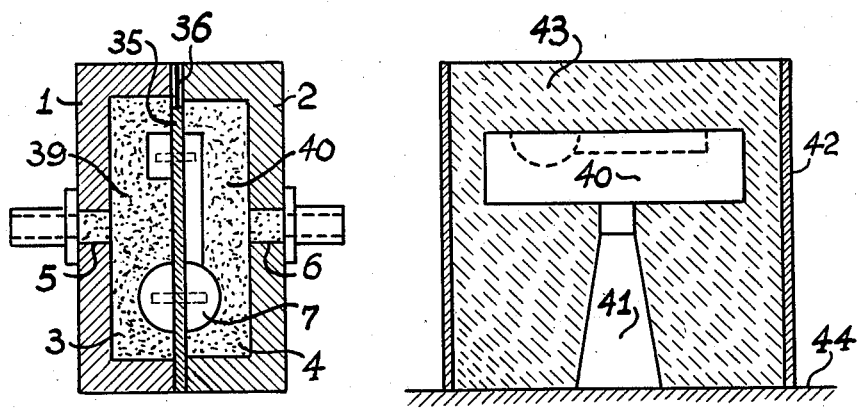

2,890,506

CAST INSERT FOR DIE

Zoltan O. St. Palley, Branford, Conn.

Application August 13, 1957, Serial No. 677,903

2 Claims. (Cl. 22—196)

My invention relates to improvements in cast inserts for dies, and has particular utility in dies used in die casting and injection molding. This being a continuation in part of my prior application, Serial No. 641,389, filed on February 20, 1957, and now abandoned.

These dies consist usually of two separable die blocks containing complementary portions of the mold. These blocks are clamped together during the casting operation and then parted for the discharge of the solidified casting. Simple molds may be carved directly into the die blocks, but more frequently these molds are manufactured as separate pieces, called inserts, and inserted into the die blocks. This arrangement is particularly advantageous in dies containing several duplicate molds, or where, due to large production, the periodic replacement of the worn mold is necessary.

In the present art these inserts are manufactured separately from the die blocks by the use of casting, hobbing and machining and they all have the serious disadvantage that their insertion and fitting into the die blocks require a large amount of highly skilled and highly paid labor representing a major item in the cost of the die.

The high cost of the insertion and fitting of the customary inserts is due to the following reasons. After an insert is completed a cavity has to be provided in the die block so as to fit the insert very accurately. Moreover, as each insert usually cooperates with another insert or mold located in the opposite die block, each cavity in the die blocks must be so prepared that it not only fits accurately the insert to be inserted, but each cavity must be also positioned with the greatest precision in relation to the corresponding cavity or mold in the opposite die block.

The principal object of my invention is to eliminate this expensive precision machining and manual work by providing inserts which are cast so as to fit automatically the cavities provided in the die blocks, regardless of the inaccuracies in the shape and size of these cavities, also which inserts may be cast so as to cooperate with great precision, even if the cavities provided for the cooperating inserts are inaccurate in relative size and location, permitting thereby the preparation of the cavities by a low cost milling process.

A further important object of my invention is to provide a very practical method for the production of cast inserts made of the highest grade materials at considerably lower cost and at much less time than customary in the prior art.

Other objects and advantages of my invention will be apparent during the course of the following description.

In the accompanying drawing, forming a part of this application, wherein for the purpose of illustration are shown preferred and modified forms of my invention, Figure 1 is a sectional view of the two cooperating die blocks, showing the cavities, Figure 2 is a sectional view of a die block with the pattern secured in position, Figure 3 is a partial sectional view of the assembled die blocks, showing the completed insert model, Figure 4 is a partial sectional view of the assembled die blocks with the cooperating insert model completed.

Figure 5 is a sectional view showing one of the insert models surrounded by refractory mold material, Figure 6 is a sectional view of the casting mold with the insert model removed, Figure 7 is a sectional view of the assembled casting mold ready for the casting of the metal insert, Figures 8, 9, 10, 11, and 12 are partial sectional views showing modified forms of the apparatus used for practicing my method, Figure 13 is a sectional view of a modified form of the casting mold employed in my method.

Referring to the drawing, Fig. 1 shows a sectional view of two cooperating die blocks, 1 and 2, having cavities 3 and 4, respectively, each provided with a hole, called filling hole, and designated by the numerals 5 and 6, respectively. It is to be noted that the cavities here illustrated are not equal in size and the corresponding walls are not in alignment. This is to indicate that with the present method the cavities may be prepared by inexpensive milling without any regard to precision.

The present task is to make a pair of removable molds which fit these cavities and are also properly positioned with respect to each other in order to produce molded plastic or die-cast metal pieces in accordance with a given pattern. These removable molds, which we will call inserts, must fulfill the following requirements. In the closed position of the die blocks, shown in Fig. 1, the two cooperating inserts must enclose and surround the pattern completely, and the inserts must meet in a contact surface surrounding the pattern so as to prevent a leakage in the closed molds. This contact surface between the two cooperating inserts must be so selected as to avoid undercuts in the molds in order to permit the opening of the die blocks and the discharge of the casting from the mold. In this preferred case the pattern 7, shown in Fig. 2, is so shaped that it permits the selection of a contact surface between the cooperating inserts which coincides with the parting plane between the die blocks 1 and 2, the pattern 7 projecting above and below this plane.

Having selected the contact surface of the insert to be made and the position of the pattern, we will proceed as follows. After separating the die blocks the pattern 7 is positioned in the cavity 3 of the die block 1, being supported by the supports 11 and 12 resting on the base plate 8, as shown in Fig. 2. This plate 8 is secured to the base of the cavity 3 by means of a screw 10, which engages the threaded hole 9 of the plate 8, and is secured to the die block 1 by the nut 13. This screw 10 is extended up to the pattern 7 and may be used for raising the pattern.

Following this, the cavity 3 is filled with hard setting fluid material, so as to form a plane top surface accurately at the level and in line with the top plane of the die block 1, as illustrated in Fig. 2. With the setting of the fluid the pattern 7 will be secured in position and the required contact surface, of the insert to be made, is established.

As the next step, the cavity 4 of the other die block 2 is provided with a backing plate 15, secured to the block 2 by the tubular screw 18 and the nut 19, and carrying the reinforcement 16, said tubular screw 18 passing through the hole 6 of the cavity 4 and being threadedly attached to the backing plate 15, as shown in Fig. 3. Then the two die blocks 1 and 2, are assembled securely and the cavity 4 is filled through the tubular screw 18 by molten low melting point material, such as molten wax, which becomes solid when cooled, thereby completing the insert model 20 of the die block 2. The function of the backing plate 15 (see Fig. 3) is two-fold; it reinforces the insert model, which is important when the low melting point material used has little mechanical strength, like some of the wax like materials used in the art; the other function of the backing plate 15 is to provide gaps between itself and the adjacent, roughly machined, surface of the cavity 4, which permit the escape of the air displaced by the incoming low melting point material, but which gaps, due to their minute size, retain the low melting point material in the cavity, even at considerable pressure. The air thus escaping from the cavity finds an exit in the hole 6 through the space between the wall of the hole 6 and the exterior of the tubular screw 18 and through the small recesses and minute gaps present between the coarsely machined ordinary nut 19 and the top surface of the block 2, also alongside the thread of said nut.

After the cooling of the low melting point material the insert model 20 is removed from the cavity 4 and placed on a smooth machined plate 27, with the tubular screw 18 of the insert model passing through a hole in said plate 27, and secured by the nut 19. A mold housing 28 is placed around the insert model 20, and is sealed to the plate 27 by a water resisting paste. Then, the housing 28 is filled with refractory mold forming material, commonly called refractory cement, which is poured into the housing 28 in the fluid form and becomes solid when set, forming the casting mold 29, illustrated in Fig. 5.

Following this, the nut 19 is removed and the casting mold 29, together with the housing 28, the insert model 20 and the screw 18, is removed from the plate 27 and exposed to moderate heating causing the partial melting of the insert model 20 and its falling out from the casting mold 29. This condition is illustrated in Fig. 6 of the drawing. The empty mold 29 is then inverted and covered by a refractory slab 32, enclosed in the mold housing extension 31, and having the necessary sprue and vent holes, and the whole assembly, shown in Fig. 7, is baked in a high temperature oven for several hours.

Finally, when the casting mold has reached the temperature set the casting mold is placed on the casting table 30 (see Fig. 7) and the metal insert is cast in the usual manner. As a result of the high baking temperature the refractory casting mold will expand which, with the proper control of the temperature and with the proper design of the pattern, well known in the art, will compensate for the shrinkage of the cast metal insert, so that the insert so obtained will have great dimensional accuracy.

The following task is the preparation of the insert model for the die block 1.

In this operation, illustrated in Fig. 4, the contact surface of the insert, to be made, with the cooperating mold can be established by placing the already completed insert model 20 in the cavity 4 of the die block 2, and, by placing the pattern 7 in the insert model 20 the pattern will be properly positioned. Following this, the cavity 3 of the die block 1, after the removal of the pattern supporting parts 8, 9, 10, 11, 12, and the hard setting material, shown in Fig. 2, is equipped with a backing plate 21, carrying the reinforcement 22 (see Fig. 4) and being held in place by the tubular screw 24 and the nut 25. Then the die blocks are assembled, as shown in Fig. 4, and through the tubular screw 24 the cavity is filled with low melting point material to form the insert model 26 required. Then, with the use of this insert model a casting mold is formed and finally the metal insert is cast, as previously described in connection with the insert model 20.

As an alternative implementation, in Fig. 4 it is equally feasible to install the finished cast insert into the cavity 4 for establishing the contact surface and for the positioning of the pattern 7.

A modification of the apparatus used in the practice of my process is illustrated in Fig. 8. Here the pattern 7 is so shaped that the contact surface of the insert of the cavity 4 with the cooperating mold must rise above the parting plane of the two die blocks adjacent to the left end of the pattern. In this case the establishing of the contact surface and the positioning of the pattern will be accomplished by filling the cavity 3 with paste like hard setting material, placing the pattern on said material before it is fully set and building up the top surface to the required contour by manual work. Following this, the cavity 4 is filled with low melting point material to form the insert model and the process continued in the manner already described until the cast insert for the cavity 4 is completed.

In the case illustrated in Fig. 9, the insert to be made for the cavity 4 will cooperate with a mold 33 carved in the die block 1. In this particular case the top plane of the die block 1 will act as the contact surface with the insert, and the pattern 7 is positioned by engaging the mold 33 in block 1. As a further modification, here the backing plate 15 is only partial and no metallic reinforcement is used in the insert model which may be permissible in case of small cavities.

Fig. 10 illustrates a case where the base surface of the pattern 7 is perfectly flat, resting on the top plane of the die block 1. Here the top plane of the block 1 will act as the contact surface of the insert of the cavity 4, and the pattern 7 is secured in position on this top plane by means of hard setting adhesive material. Alternatively, the positioning of the pattern may be accomplished in the manner shown in Fig. 11 where a smooth and flat positioning plate 35 is placed on the die block 1 and the pattern 7 is secured to this plate by dowel pins or screws. As a further modification, here the cavity 4 has two holes, one of which threadedly engages the tubular screw 18, and is used for the filling of the cavity with low melting point material; the other hole is used as an exit for the displaced air, and is covered by a backing plate secured by the screw 34.

Another alternative arrangement is shown in Fig. 12, in which the pattern is split along the parting line of the die blocks and is secured to a positioning plate 35. In this case the contact surface of each insert in defined by the adjacent surface of the plate 35. The two inserts 39 and 40 may be formed simultaneously by forcing in low melting point material into the cavities 3 and 4 through the holes 5 and 6, respectively, holding the die blocks as shown in Fig. 12, and allowing the displaced air to escape from the cavities through the grooves 36 cut into the plate 35. The low melting point material used here is one of the wax compounds known in the art of investment casting, and the insert models contain no metallic reinforcement.

Fig. 13 shows an alternative arrangement of the casting mold which may be applied optionally whenever the insert model contains no metal or other high melting point material, such as the insert model 40 of Fig. 12. The casting mold 43 is formed here by welding a cone of wax compound 41 to the insert model 40 (see Fig. 13), placing it into a mold housing 42, resting on a table 44, and filling the housnig 42 with investment cement mixture. After this investment cement has hardened, the wax model 40 and cone 41 are melted out and then the mold is baked in a high temperature oven. When the casting mold 43 has reached the required temperature the mold is inverted and the metal insert is cast, using the hole vacated by the wax cone 41 as a sprue.

The inventive concept underlying my process is that, whereas in the prior art the inserts are made separately from the die blocks and precision machining and skilled labor are relied upon for the proper coordination of each insert with the cooperating molds and cavities, my process produces, by casting, inserts of accurate dimensions, and already properly coordinated, and accomplishes this by the application of a novel element, the insert model, cast of low melting point material with the cooperation of the die blocks and their cavities. The important new result of my process is that the dimensional accuracy and the exact cooperation of the inserts so produced are not affected by the inaccuracies in the size, shape and relative position of the cavities in the die blocks, thereby eliminating a large amount of expensive machining and manual fitting. This important result is accomplished with my method by the performance of novel operational steps necessary to place the die blocks in condition for cooperation in the casting of the insert. In the prior art, where the inserts are made without the cooperation of the die blocks, these operational steps of my method are not applicable.

It is to be understood that the forms of my invention, herein shown and described are only examples of the same, and that various changes in the material, shape, and arrangement of parts may be resorted to, without departing from the spirit of my invention, or the scope of the subjoined claims.

I claim:

1. A method of making a cast insert for one of a pair of separable cooperating die blocks, said insert to complement an opposing mold in the other cooperating die block in enclosing a pattern, and to meet said opposing mold in a contact surface surrounding said pattern; said method comprising the following steps: making a cavity of approximately predetermined dimensions in one die block opposite the mold of the other cooperating die block; providing a filling hole leading from said cavity to the exterior of the die block; providing a backing plate adjacent to the wall of the cavity having said filling hole, with an air gap between said plate and adjacent wall of such small dimension as to permit the passage of air but prevent the passage of molten low melting point material; providing a tubular screw passing through said filling hole with an air space between the exterior of said screw and the wall of said filling hole, in communication with said air gap and with the outside atmosphere, one end of said screw being secured to said backing plate; securing the said backing plate in position within the cavity; securing the pattern and the contact surface in the proper position in relation to said mold of the other cooperating die block; assembling the said cooperating die blocks; filling the space bounded by the said cavity, contact surface and pattern by molten low melting point material, through said tubular screw, to form the insert model; forming a casting mold by surrounding said insert model by mold forming material; removing said insert model from said casting mold; casting the insert in said casting mold.

2. The method of claim 1 which includes also the securing of reinforcement to the backing plate.

References Cited in the file of this patent

UNITED STATES PATENTS

| | | |
|---|---|---|
| 1,002,889 | Whittemore | Sept. 12, 1911 |
| 1,357,503 | Lucier | Nov. 2, 1920 |
| 2,397,168 | Touceda | Mar. 26, 1946 |
| 2,408,005 | Slatis | Sept. 24, 1946 |
| 2,420,756 | Miller | May 20, 1947 |
| 2,734,243 | Lips | Feb. 14, 1956 |